United States Patent [19]

Moshtev et al.

[11] Patent Number: 4,693,950
[45] Date of Patent: Sep. 15, 1987

[54] SECONDARY LITHIUM CELL

[75] Inventors: Rafail V. Moshtev; Vesselin G. Manev; Bogdana L. Puresheva, all of Sofia, Bulgaria

[73] Assignee: Zlehit pri Ban, Sofia, Bulgaria

[21] Appl. No.: 792,901

[22] Filed: Oct. 30, 1985

[30] Foreign Application Priority Data

Oct. 30, 1984 [GB] United Kingdom ............. 67349

[51] Int. Cl.$^4$ ........................... H01M 10/40
[52] U.S. Cl. .......................... 429/194; 429/218
[58] Field of Search ................... 429/218, 194

[56] References Cited

U.S. PATENT DOCUMENTS 4,463,072  7/1984  Gifford et al. .............. 429/194

OTHER PUBLICATIONS

Gabano, Lithium Batteries, 1983, Academic Press, pp. 388–397.

Primary Examiner—Donald L. Walton

[57] ABSTRACT

A rechargeable current-generating cell is disclosed, composed of
(a) an anode made of lithium or its alloys;
(b) a non-aqueous electrolyte solution with a solid electrolyte or a molten electrolyte; and
(c) a cathode of a vanadium-substituted alkali thiochromite having the general formula $Na_yCr_{1-x}V_xS_2$, wherein x lies between 0.05 and 0.3 and y is 1 for the stoichiometric compound and from 0.1 to 0.4 for the non-stoichiometric one. The non-stoichiometric compound is obtained from the stoichiometric compound, by electrochemical oxidation thereof, either in the cell, after its assembly, or in a non-aqueous electrolyte solution in a separate vessel, prior to assembly of the cell. The non-stoichiometric compound can also be obtained by chemical oxidation of the stoichiometric one in a nonaqueous solution of iodine. The vanadium-substituted alkali thiochromite displays a substantially higher specific conductivity than the pure sodium thiochromite, whereby cathodes prepared with the new, substituted species can be discharged at higher current densities without reduction of energy density. Moreover, the open circuit voltage of the substituted species cathode is higher, resulting in a greater gravimetric energy density.

4 Claims, No Drawings

SECONDARY LITHIUM CELL

BACKGROUND OF THE INVENTION

The present invention relates to secondary galvanic cells with alkali anode and non-aqueous electrolyte solution in general and, more particularly, to those employing a cathode material which allows for the repeated recharging of the cells.

A considerable number of secondary cells with an alkali anode and a non-aqueous electrolyte solution have been described. These employ as cathode materials the dichalcogenides, i.e. the dioxides, disulfides, diselenides and ditellurides, of the transition metals of the IV B, V B, and VI B groups of the Periodic Table of the Elements. All of these compounds have a layered crystal structure and permit repeated reversible intercalations of alkali metal ions, whereby their lattice parameters change only to an insignificant extent. The best electrochemical performance thus far reported in the scientific literature is achieved with Li cells using stoichiometric $TiS_2$ as a cathode material. However, the synthesis of this material is time consuming and difficult. Moreover, the pure titanium sponge employed as a starting material is rather expensive.

Chromium is a more easily available transient metal. However, all attempts to synthesize $CrS_2$ directly have hitherto failed. A more successful approach to the obtention of a stable, layered compound based upon Cr, which can reversibly intercalate alkali metal ions and, more particularly, those of lithium, is the use of sodium thiochromite, i.e. $NaCrS_2$, from which the non-stoichiometric compound, i.e. $Na_yCrS_2$ ($0.1 < y < 0.4$) is obtained by means of electrochemical or chemical oxidation, thereby providing sites for the reversible intercalation of Li. The non-stoichiometric sodium thiochromite, $Na_{0.2}CrS_2$, is likewise a layered compound, possessing the same stable crystalline structure as the stoichiometric species, thereby permitting repeated electrochemical recharging in lithium cells with non-aqueous electrolyte solutions. However, this compound is characterized by a very low electronic conductivity, which strongly hinders the diffusion of the alkali ions in the crystal lattice of the host. The electron transfer from the cathode material to the current collector is also retarded. This imposes the use of a larger amount of electroconductive additives, such as e.g. graphite or carbon black. The result is that the permitted current drains are limited to approximately 1 mA/cm$^2$.

SUMMARY OF THE INVENTION

The object of the present invention is to make available a secondary lithium cell, with a non-aqueous electrolyte, employing a cathode made of a layered compound, which can repeatedly intercalate and deintercalate alkali ions, which compound can be easily obtained and from available and inexpensive materials, such secondary lithium cell being characterized by a considerable energy density at comparatively high current drains, whereby its energy density should not rapidly decrease during cycling.

This object is attained according to the present invention by assembling a secondary lithium cell with a non-aqueous electrolyte, wherein the cathode material is made of a stoichiometric or non-stoichiometric alkali thiochromite, in which part of the chromium is substituted by another first row transient metal, in particular, by vanadium. The general formula of the new compound is $M_yCr_{1-x}V_xS_2$, wherein M is sodium or potassium, x is a numerical value between 0.05 and 0.3, and y has a value of 1 for the stoichiometric compound, but lies between 0.1 and 0.4 for the non-stoichiometric compound.

The major advantages of employing a cathode material prepared from the vanadium-substituted alkali chromite according to the present invention are as follows:

The specific conductivity of samples of $NaCr_{1-x}V_xS_2$ with $x=0.2$ is some three orders of magnitude higher than that of the pure sodium thiochromite. This greater conductivity accelerates the diffusion of the lithium ions into the crystal lattice of the host compound and strongly reduces the ohmic drop in the cathode. A result is that the cathodes prepared according to the present invention with the vanadium-substituted sodium thiochromite can be discharged at current densities as high as 8 mA/cm$^2$ without considerable reduction of the energy density.

The open circuit voltage of the lithium cell according to the present invention, with a cathode of vanadium-substituted sodium thiochromite, e.g. one having about 0.15 eq./mol vanadium, is 2.8 V when half of its capacity has been drained, as compared to 2.5 V for a similar cell under otherwise similar conditions, but having a cathode or pure, unsubstituted sodium thiochromite. This increased voltage effects a considerable gain in the energy density of the cell with the new cathode material according to the present invention. Thus, for a lithium cell with a cathode prepared from $NaCr_{0.85}V_{0.15}S_2$ and discharged at 1 mA/cm$^2$, the gravimetric energy density, calculated with respect to the weight of only the active materials, and to the mid-discharge voltage, is 0.45 wh/g, whereas it amounts to only 0.30 wh/g for an otherwise similar lithium cell possessing a cathode of pure, unsubstituted sodium thiochromite.

For $x < 0.2$, the vanadium-substituted sodium thiochromite is single phase and displays the same rhombohedral 3R structure as that of the pure, unsubstituted thiochromite, with practically the same lattice parameters.

The present invention is illustrated with greater particularity by the following specific embodiments, but the invention should not be considered as being limited to the details thereof.

DESCRIPTION OF THE PREFERRED EMBODIMENTS

EXAMPLE 1

A secondary lithium cell is assembled, having a cathode material from stoichiometric vanadium-substituted sodium thiochromite, corresponding to the formula $NaCr_{0.85}V_{0.15}S_2$, and possessing the rhombohedral crystalline structure of the pure, unsubstituted sodium thiochromite, $NaCrS_2$. The cathode mix contains, by weight, 80% of this compound, 14% acetylene black, and 6% Teflon powder. About 0.1 g of this mixture is pressed onto an expanced nickel grid with a geometric surface area of about 1 cm$^2$, at a pressure of 1 to 8 t/cm$^2$. The anode is a 0.3 to 0.5 mm lithium foil wrapped in an appropriate separator material (e.g. microporous polypropylene or microporous polyethylene) with a thickness of 0.05 to 0.1 mm. A 1 molar solution of $LiClO_4$ in a mixture of propylene carbonate and dimethoxyethane (1:1 by volume) is used as an electrolyte. The cell is charged at 0.2 to 1 mA/cm$^2$ to a voltage limit of 3.2 V. The result of the charging is that about 75% of the sodium is extracted from the stoichiometric compound, whereby the non-stoichiometric compound, $Na_{0.25}Cr_{0.85}V_{0.15}S_2$, is obtained. The cathode efficiency during discharge to 1.5 V, the mid-discharge voltage, and the energy density of this cell, calculated with respect to the weight of only the active materials and the mid-discharge voltage, are presented below in Table 1, as a function of the current density during discharge.

TABLE 1

| Current density, mA/cm$^2$ | Cathode efficiency, % | Mid-discharge voltage, V | Energy density, wh/g |
|---|---|---|---|
| 0.2 | 90 | 2.75 | 0.48 |
| 1.0 | 84 | 2.65 | 0.43 |
| 2.0 | 80 | 2.60 | 0.40 |
| 4.0 | 73 | 2.45 | 0.35 |
| 8.0 | 52 | 2.30 | 0.23 |

The cell is cycled at 2 mA/cm$^2$ during charge and discharge, for 100 cycles, within the voltage limits of 1.5 to 3.2 V, whereby the cathode efficiency drops only from a value of about 80% to a value of about 70%.

A similar second cell can also be made, with the cathode prepared as described above, however, prior to its assembly in the cell, the cathode is charged in a separate vessel containing the same electrolyte solution and an inert nickel grid electrode. The charging is carried out at a current of 0.2 to 1 mA/cm$^2$, to a voltage limit of 3.2–3.4 V with regard to a reference Li/Li$^+$ electrode. The charged cathode is then used in assembling the secondary lithium cell as described above in the first part of this example. The initial electrochemical characteristics and their alteration during cycling of this cell with a pre-charged cathode are similar to those of the cell in which the cathode is charged after assembly of the cell.

EXAMPLE 2

A sample of the stoichiometric vanadium-substituted compound of the formula $NaCr_{0.85}V_{0.15}S_2$ is oxidized in an excess of a 0.1 to 0.4M solution of iodine in acetonitrile, for about one hour, with stirring. After washing the product with pure acetonitrile, and then drying, the obtained non-stoichiometric compound possesses a composition corresponding to the formula $Na_{0.2}Cr_{0.85}V_{0.15}S_2$. A cathode is then prepared with this compound, whereupon a lithium cell is assembled with the cathode in accordance with the procedure described above in Example 1. This cell is then ready for discharge. Its electrochemical parameters, and their alteration during cycling, prove to be close to the values obtained for the cells described in Example 1.

Although the invention is described and illustrated with reference to a pluarality of embodiments thereof, it is to be expressly understood that it is in no way limited to the disclosure of such preferred embodiments, but is capable of numerous modifications within the scope of the appended claims.

We claim:

1. A secondary lithium cell comprising an anode of lithium or its alloys, an electrolyte solution containing an ionizable lithium salt in a non-aqueous solvent in the liquid, solid or molten state, and a cathode of an alkali thiochromite, wherein part of the chromium of said thiochromite is substituted with another transition metal, vanadium, said substituted alkali thiochromate having the following general formula $$Na_yCr_{1-x}V_xS_2,$$

with
x being a numerical value from 0.1 to 0.2, and
y being equal to 1 for a stoichiometric compound, and a value from 0.1 to 0.3 for a non-stoichiometric compound.

2. The secondary lithium cell according to claim 1, wherein said cathode is prepared from said stoichiometric compound, and said stoichiometric compound then being oxidized electrochemically, to a value of y equals from 0.1 to 0.3, into said non-stoichiometric compound, in said cell after assembling of said cell.

3. The secondary lithium cell according to claim 1, wherein said cathode is prepared from said stoichiometric compound, and said stoichiometric compound is oxidized electrochemically, to a value of y equals from 0.1 to 0.3, into said non-stoichiometric compound, prior to assembling of said cell, in a non-aqueous electrolyte solution in a separate vessel.

4. The secondary lithium cell according to claim 1, wherein said cathode is prepared from said non-stoichiometric compound, said non-stoichiometric compound having been obtained by chemical oxidation of said stoichiometric compound in a non-aqueous iodine solution.

* * * * *